United States Patent [19]

Onthank

[11] Patent Number: 5,563,685
[45] Date of Patent: Oct. 8, 1996

[54] APPARATUS FOR ASSISTING MANUAL PLACEMENT OF AN ORIGINAL DOCUMENT ON AN EXPOSURE PLATEN OF COPIER

[75] Inventor: James F. Onthank, Rochester, N.Y.

[73] Assignee: Xerox Corporation, Stamford, Conn.

[21] Appl. No.: 324,205

[22] Filed: Oct. 17, 1994

[51] Int. Cl.⁶ .............................. B41L 3/02; G03B 27/62
[52] U.S. Cl. ..................... 355/75; 355/230; 271/227; 271/245; 271/253
[58] Field of Search ................................. 355/203, 230, 355/231, 75, 72; 250/559.4; 358/488; 271/227, 245, 253, 254

[56] References Cited

U.S. PATENT DOCUMENTS

| | | | |
|---|---|---|---|
| 4,505,575 | 3/1985 | Palumbo | 355/14 |
| 4,541,713 | 9/1985 | Maekawa | 355/75 |
| 4,588,289 | 5/1986 | Imoto | 355/57 |
| 4,707,111 | 11/1987 | Inuzuka et al. | 355/8 |
| 4,835,403 | 5/1989 | Wisniewski | 250/561 |
| 5,218,408 | 6/1993 | Inada et al. | 355/231 |
| 5,321,624 | 6/1994 | Helffrich et al. | 364/478 |
| 5,333,043 | 7/1994 | Yamada | 355/309 |
| 5,477,304 | 12/1995 | Nishi | 355/53 |

FOREIGN PATENT DOCUMENTS 60-030259  2/1985  Japan.

OTHER PUBLICATIONS

IBM Technical Disclosure Bulletin vol. 17. No. 9 Feb. 1975 Copy Sheet Size Selection, J. L. Bacon pp. 2690–2690A.

Primary Examiner—Arthur T. Grimley
Assistant Examiner—David A. Lane
Attorney, Agent, or Firm—R. Hutter

[57] ABSTRACT

A system for assisting manual placement of odd-shaped original documents on the exposure platen of a copier or scanner includes a detection device disposed on an edge of the platen. The device includes a light source emitting a light beam substantially parallel to a surface of the platen, and a photosensor adapted to detect light resulting from the reflection of the light beam by an object on the surface of the platen. A main focus direction of the light source and a main focus direction of the photosensor intersect at a predetermined position on the surface of the platen.

18 Claims, 3 Drawing Sheets

FIG. 1 PRIOR ART
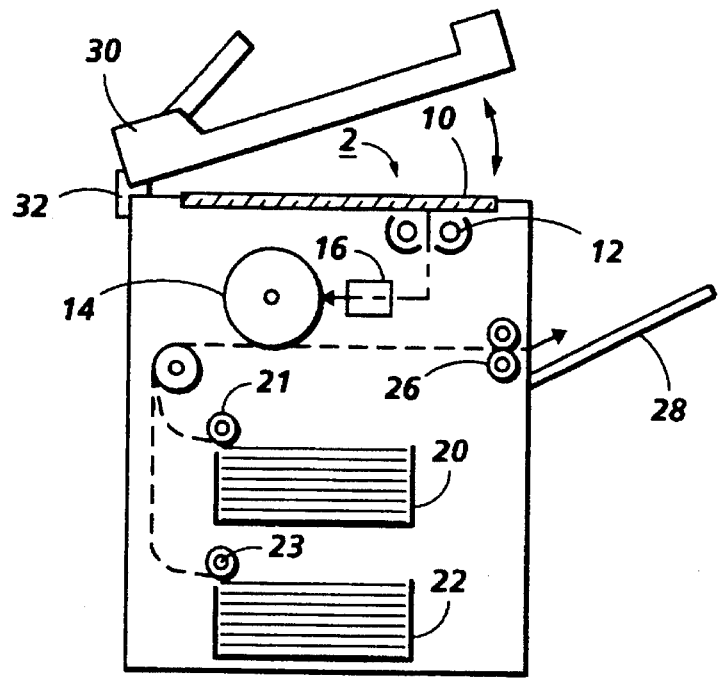
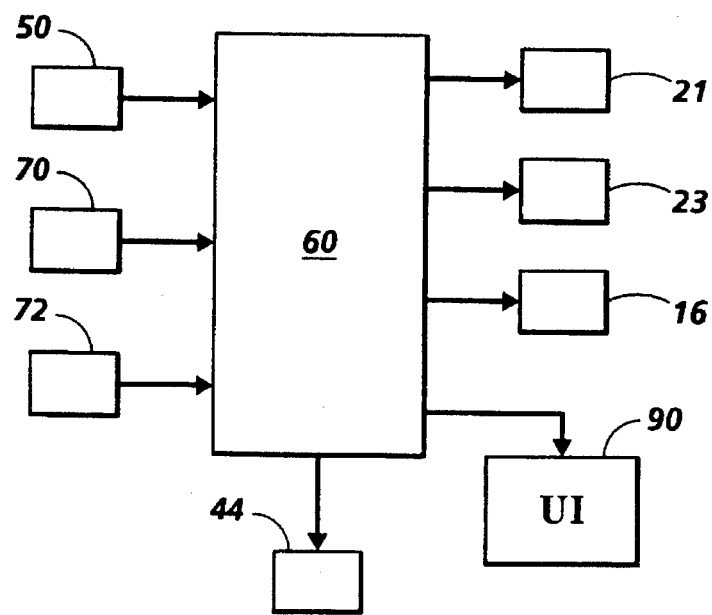
FIG. 4

FIG. 2
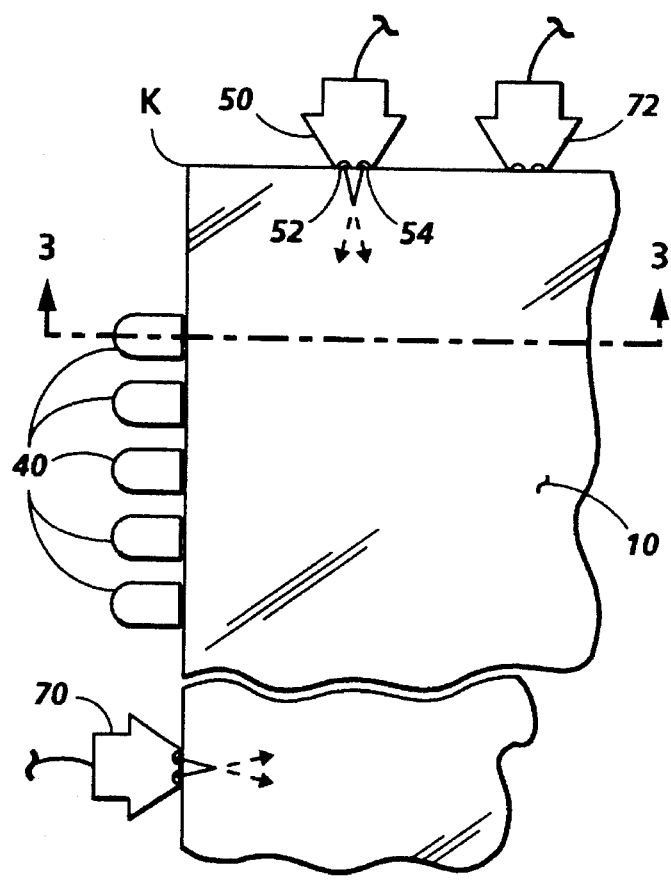
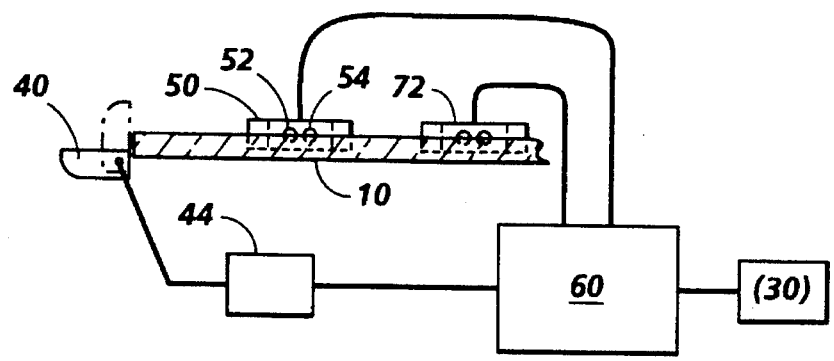
FIG. 3

APPARATUS FOR ASSISTING MANUAL PLACEMENT OF AN ORIGINAL DOCUMENT ON AN EXPOSURE PLATEN OF COPIER

The present invention relates to an apparatus which assists the manual placement of original documents on an exposure platen of a device which records the original document, such as a copier or a digital scanner.

In the everyday use of copiers, the original documents which are copied can vary widely in size and in other qualities. Checks and receipts, for example, tend to be on paper which is not only small in size but relatively thin compared to typing paper. If a person wishes to make copies of a large number of small documents such as receipts and checks, one is typically required to place the original document manually on the exposure platen, because automatic document handling systems for originals are typically unsuited for circulating odd-shaped documents. Even if the documents are manually placed on the platen, it may be desirable to provide structures on the copier which assist on the manual placement of documents. One type of assistance may be in the form of a "stop" disposed along one edge of the platen, against which a person may gently urge the original document, so that the document is placed properly on the platen. The advantage of a stop is that one edge of the original document is aligned with an edge of the platen, and so the copy image will not be crooked on the copy sheet.

In copying or scanning devices which use an original document handler, it is desirable that the surface around the platen be substantially flush with the platen so that the original documents moving through the document handler can easily slide into position relative to the platen. Thus, while a stop at the edge of a platen is useful for manual placement of documents, such a stop is likely to interfere with the use of an automatic original document handler. The "1090" series of copiers made by the Xerox Corporation includes a retractable stop, which is selectably disposable in a non-functional and in a functional position at the edge of the platen. In a functional position, the stop is raised from a position flush with the platen to a position protruding above the platen. This positioning of the stop is preformed by electro-mechanical means, such as using a solenoid.

It is an object of the present invention to provide a system that will assist in the manual placement of documents on a platen by activating a stop when an original document is detected on the platen. The document-detection system according to the present invention may also be useful in the automatic selection of either magnification or copy sheet size in a copier.

In the prior art, the article "Copy Sheet Size Selection" in IBM Technical Disclosure Bulletin Vol. 17, No. 9, February 1975, discloses a system in which a detector senses the leading and trailing edges of an original sheet circulating through an automatic original document handler, and then selects an appropriate copy sheet size based on measuring the original document.

U.S. Pat. No. 4,541,713 discloses a document size-detecting device for a copying machine. A platen cover is provided with a plurality of colored portions. A light projector irradiates the surface of the platen, including the colored portions thereof, and light is reflected into light-receiving means which distinguish the colored portions from the rest of the surface. The light receiving means generates an output signal which is used to determine whether the signal is in the range corresponding to the wavelength of the colored portions.

U.S. Pat. No. 4,588,289 discloses a document size reading device. The edges of the original are detected by an edge detector which is mounted on a moving unit which passes underneath the original.

U.S. Pat. No. 4,707,111 discloses a copier wherein the copy sheets can be taken from a container or manually supplied. A first detector detects the size of the manually supplied copy sheets and a second detector detects the size of the copy sheets in the container. A controller controls the movement of the scanner (the exposure device) in accordance with the detection by the first and second detectors so that the scanning stroke length of the scanner is coordinated for the size of the copy sheet.

U.S. Pat. No. 5,321,624 discloses an "insertion machine" having a plurality of document detectors, each detector being preset to a maximum allowable document-group-thickness measurement. A processing means determines the actual number of documents in a stack according to which detector was the first to be "tripped."

U.S. Pat. No. 5,333,043 discloses an automatic original document feeder having a plurality of photosensors to coordinate the motion of sheets therethrough.

According to one aspect of the present invention, there is provided an apparatus for assisting placement of an original document on an exposure platen. A photosensor is provided, having an effective detection zone extending substantially parallel to a surface of the platen. An extendible stop is disposed adjacent an edge of the platen, the stop being adapted for manual urging of an original document thereagainst. Control means extend the stop from a non-functional position to a functional position in response to a sheet being detected on the surface of the platen by the photosensor.

According to another aspect of the present invention, there is provided an apparatus for assisting placement of an original document on an exposure platen, comprising a light source emitting a light beam substantially parallel to a surface of the platen, and a photosensor adapted to detect light resulting from the reflection of the light beam by a sheet on the surface of the platen.

According to another aspect of the present invention, there is provided an apparatus for assisting placement of an original document on an exposure platen, comprising a light source emitting a light beam in a focus direction substantially parallel to a surface of the platen, and a photosensor adapted to detect light resulting from the reflection of the light beam by an object on the surface of the platen. A main focus direction of the photosensor intersects the focus direction of the light source at a predetermined position on the surface of the platen.

In the drawings:

FIG. 1 is an elevational view showing the basic elements of a copier which may;

FIG. 2 is a plan view of certain elements relating to the present invention in relation to an exposure platen such as in the apparatus of FIG. 1;

FIG. 3 is a partially-sectional elevational view through line 3—3 of FIG. 2, and including system elements;

FIG. 4 is a systems diagram showing elements of one embodiment of the present invention.

Figure 5:
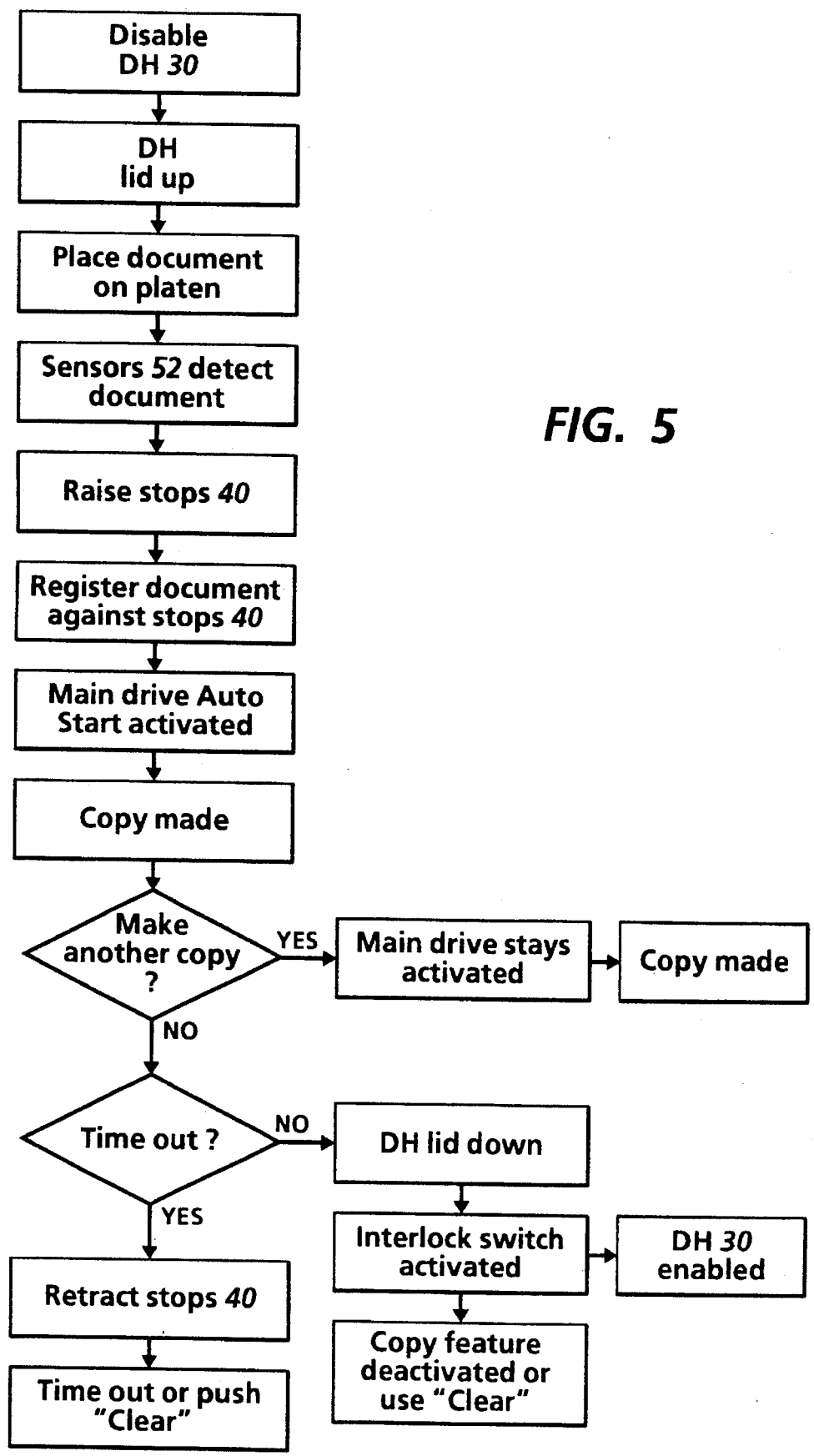
FIG. 5 is an example flowchart of a copier control procedure which may incorporate the present invention.

FIG. 1 is a simplified elevational view showing the basic elements of a copier with which the system of the present invention may be used. In the present application, the word "copier" is used in the broad sense of any device in which a hard-copy original is exposed and the information thereon recorded. As such, the word "copier" can mean the familiar light-lens copier, and also any digital system in which light reflected from the original document is recorded on a photosensitive device and converted into digital signals.

A hard-copy original document is placed on a platen 10, where it is illuminated by light source 12, and the light reflected therefrom directed to an image recording device here indicated as 14. The reflected light from original document 10 may pass through any number of focusing and/or magnification means such as that indicated as 16. As shown in FIG. 1, the image recording device is shown as a photoreceptor drum, but could conceivably include any other means for recording and/or copying an image, such as a CCD or other photosensitive device, and could also be used to create a copy of the original image either by use of a photoreceptor, or other means such as an ink-jet printhead.

When an image is copied by the copier, the copied image must be placed on a copy sheet. It is common in the art that a copier is able to provide at least two different types of copy sheet such as letter-size or legal-size, or else plain paper and letterhead, or two different colors of paper, or the copier may have an option of creating the copy image on a transparency. As shown in FIG. 1, there are provided two trays for different types of copy sheet. Either tray 20 and 22 includes feeder means such as motorized rolls 21 or 23 respectively which cause a sheet taken from the tray to pass through an apparatus where an image will be placed on the sheet, in this case photoreceptor 14. The sheets having copy images placed thereon are then fed out (in an electrophotographic system) through a fuser such as 26, and deposited in an output tray 28.

It can also be seen in FIG. 1 that there is provided, at the top of the copier, an original document handler generally indicated as 30. Various designs of automatic original document handlers are known in the art. Basically, the function of the original document handler is to cause a set of original documents loaded thereon to be sequentially indexed past the platen 10 for exposure. The actual operation of the automatic original document handler is not directly relevant to the present invention, but a common design is to place the document handler on a hinge such as 32 so that the document handler 30 can be swung out of the way when the document handler is not desired to be used. The platen 10 can then be directly accessed for manual placement of original documents.

FIG. 2 is a plan view, looking down in the view marked 2 in FIG. 1, showing details of the platen 10 in an apparatus according to the present invention. It is common in commercially-available copiers and other scanners that an original document be positioned relative to a reference position on the platen so that the document will be properly placed relative to the exposing apparatus. Proper placement of an original document is particularly important when magnification is used. In the illustrated embodiment, it is intended that the corner of the original document be placed in the reference corner K as shown in the Figure; using a corner of the platen 10 as a reference point is a fairly common design in copiers and scanners.

Along one edge of the platen 10 is a set of stops indicated as 40. Some of these stops are preferably located generally near reference corner K of the platen 10. Also disposed near the reference corner K opposite the stops 40 is a detector, such as indicated as 50, which is preferably in the form of a "passive infrared" or "passive IR" device. Device 50 is preferably of a type which is commercially available, such as, for example, the device known as OPB2731 made by Optek, Inc., or an equivalent device such as made by TRW. According to the present invention, there is provided (such as within the passive IR device 50) a light source which emits a light beam in a direction substantially parallel to the surface of the platen, and also a photosensor, (i.e., an infrared sensor) which is adapted to detect light resulting from the reflection of light from the light source by an object, such as a sheet, placed on the surface of the platen. It is common with infrared sensors to include a lens, pinhole, or similar element in combination with the sensor, so that the photosensor is in effect "focused" to detect light received along a specific direction. As described in the claims herein, the "detection zone" of the photosensor is the zone from which a photosensor is readily able to detect light of a certain type, and such a zone is typically in the form of a narrowly-defined area extending from the photosensor.

According to the present invention, the photosensor should be focused in a direction substantially parallel to the surface of the platen. Turning to the example in FIG. 2, the device 50 includes a light source 52 and a photosensor 54, the focus direction of each being shown by the arrows emanating therefrom. As shown in the Figure, these focus directions preferably intersect at a location between ¼ inch and one inch from the edge of the platen 10. In such a position, the device 50 is capable of detecting the presence of objects, such as an edge of a sheet bearing original images, on the surface of platen 10, and particularly in the area of intersection.

The photodetector of the present invention is preferably disposed so that the light source 52 and photodetector 54 are focused as close to the surface of platen 10 as possible. FIG. 3 is a partial sectional view through the line 3—3 in FIG. 2, showing the preferred position of the device 50. There can also be seen in FIG. 3 one extendible stop 40. According to the present invention, this stop is extendible from a non-functional position, wherein it is essentially flush with the surface of platen 10, to a functional position, wherein it protrudes above the surface of the platen, as shown in phantom in the Figure. This extension of the stop 40 is carried out by electro-mechanical means generally indicated as 44, which could include, for example, a small electric motor, stepper motor, or solenoid, or any device which is capable of changing position in response to an electrical signal. When the electro-mechanical means 44 is activated, stop 40 (or any number of stops 40) extends to a functional position protruding above the surface of platen 10. Stop 40 in the functional position can assist in the manual positioning of an original document, such as a small receipt or check, so that it is straight on the platen and results in an image on the copy sheet which is properly aligned relative to the edges of the copy sheet.

According to one embodiment of the invention, when the copier is in a mode for accepting manual placement of original documents on the platen 10, the detector 50 is adapted to detect sheets or other objects (such as a book) on the surface of platen 10. As shown in FIG. 3, the device 50 is operatively connected to a control means such as 60, which operatively connects the device 50 (or, more specifically, the photosensor 54 in device 50) to the electro-mechanical means 44 which ultimately cause stop 40 to extend to the functional position. Thus, when a person places a document such as a check or a book manually on the surface of platen 10, the infrared light emitted from infrared source 52 will reflect from the edge of the sheet or book, and the reflected light will be detected by photosensor 54.

When a detector such as device 50 is mounted relative to the platen 10 as shown, even single sheets may be detected because the direction of focus of both the light source 52 and photodetector 54 are as close as possible to being directly across the surface of platen 10. Typically, the protrusion of device 50 over the surface of platen 10 need be no more than 1 mm, and preferably closer to 0.5 mm. When such a sheet or other object is detected, a signal will appear on photosensor 54, and this signal from photosensor 54 can be used to activate, through means known to one of skill in the art, control means 60, which in turn activates the electromechanical means 44, typically by applying an electrical signal thereto. When the stop 40 is extended to a functional position, the person manually placing documents on the platen 10 will then have the surface of stop 40 against which to gently urge the small document so that the document will be properly aligned with the edge of the platen 10.

One variation to the present invention would be to provide, instead of a discrete emission/detection device such as 50, a more general source of IR or other light, such as a light bar emitting light evenly along one edge of platen 10, in combination with a set of pinpoint-size photodetectors along the same or another edge of platen 10. Such an arrangement may have advantages for specific document-handling applications. Another variation would be to provide an arrangement of fiber-optic devices to place the infrared source 52 and photosensor 54 in effect at the desired positions at the edge of the platen 10, even if the actual light source and detector are disposed elsewhere in the apparatus. That is, infrared source 52 and photosensor 54 could be placed on chips deep within the copier and fiber-optic cable could be used to optically connect the chips to the desired locations at the edge of the platen 10.

It will also be noted in FIG. 3, that the control means 60 should interact with the position of the automatic original document handler indicated as 30 in FIG. 1, and shown as a box in FIG. 3. Generally, the means for raising the stop 40 according to the present invention is only necessary when documents are being placed manually on the platen 10, and otherwise would probably interfere with the function of an automatic original document handler 30. Thus, the feature of raising the stop 40 when a document is detected on the platen 10 can be disabled when the document handler 30 is lowered to a usable position. This may be accomplished by any means known in the art, such as, for example, having the pivoted document handler press down a switch when it is lowered into the usable position, or any other means for indicating the use of an automatic document handler. Of course, the feature of raising the stop 40 when a document is detected on platen 10 can also be activated or disabled by a switch on the machine itself accessible directly to the human user.

Returning to FIG. 2, additional devices similar to 50, such as those indicated as 70 and 72, can also be used for other specific purposes which may assist in the placement of original documents on the platen 10. For example, it can be seen that device 70, which functions in the same manner as device 50, is disposed along the same edge of the platen 10 as the stops 40. Device 70 is placed in such a position that an original document smaller than a given size would not be detected by the device, while an original document larger than a certain size would be detected by the device. One commonly-useful layout would be, for example, to place the device 70 twelve inches from the reference corner K, so that the device 70 is capable of detecting legal-size (8.5"×14") paper but would not detect letter-size (8.5"×11") paper. Thus, if legal-size paper is detected by device 70, the machine could be automatically activated to select legal-size copy paper from a tray such as 20 or 22 as shown in FIG. 1.

Similarly, a device such as 72, disposed at a preselected distance from reference corner K as shown, could detect the presence of documents of a sufficient size relative to the distance between reference corner K and one or both of the devices 50 and 72. If an original document is placed on the platen 10, and the document is detected at device 50 but not device 72, then the system may recognize that a document is of a certain small size (i.e., large enough to be detected by device 50, but not extending to device 72) and that the user may desire the option of magnifying the small document.

FIG. 4 is a simplified systems diagram showing an extended version of the control system of the present invention. Once again, as in FIG. 3, the control system is generally indicated as 60; the boxes given reference numerals are intended to represent the physical elements, such as detectors, rollers, etc., disclosed in FIGS. 1–3. In FIG. 4 it can be seen that the inputs to control system 60 include detectors 50, 70, and 72, which are adapted to indicate the presence of a document at various locations along the edges of the platen 10. Among the outputs of control system 60 are the motors associated with rollers such as 21 and 23 shown in FIG. 1. As mentioned above, activation of one or the other of these rollers 21, 23 will relate to the selection of one or another size of copy sheet such as legal or letter size. It will be apparent that if the detector 70 as shown in FIG. 2 is used to detect an extra-long document, the presence of a document detected by device 70 would cause control system 60 to select the motor for roller 21 or 23 associated with legal-size paper so that the recorded image will fit onto the copy sheet. Similarly, control means 60 can be used to activate the focus/magnification device 16, as shown in FIG. 1, such as when device 50 detects the presence of a document while device 72 does not; in such a case, what may be present on the platen 10 is a document of such a small size that magnification by magnification means 16 could be desired. Of course, it may be left to the user whether to activate a magnification device 16, and therefore control means 60 could also be operatively connected to a user interface generally indicated as 90, which may include a screen or other display device which displays to the human user a message such as "SMALL ORIGINAL DOCUMENT DETECTED—ADJUST MAGNIFICATION IF DESIRED". Also, control means 60 could be used to activate the electro-mechanical means 44 which extend the stop 40 to a functional position. Another conceivable function of control means 60 could be to provide for an automatic exposure of the document (i.e., in effect "push the button" of the copier) a fixed time after the document is detected on the platen, so that a large number of small documents may be copied rapidly.

FIG. 5 is an example flowchart showing how a system using the present invention can be incorporated in a copier. As can be seen in FIG. 5, when the automatic document handler 30 is disabled and swung into the up position, the sensors such as 52 can detect the presence of a document on platen 10. When such a document is detected, stops 40 are raised. After some time is given for allowing the user to register the document against stops 40, the main drive of the copier, which initiates the entire copying process, is activated, in a manner familiar in the art. After the copy is made of the document on the platen, various timing devices can be employed to determine whether another document is to be manually placed on the platen 10. It may be desirable to leave the stops 40 up for a few seconds to give time to the user to place another original document on platen 10, as shown in the flowchart of FIG. 5. However, if the copier detects no activity after a predetermined number of seconds, a time-out procedure can be initiated with the stops 40 being retracted. Otherwise, if the lid of document handler 30 is put down, an interlock switch which detects the position of document handler 30 may be activated, to re-enable the document handler 30. The flowchart of FIG. 5 is given as an example only, and different system-wide procedures for using the system of the present invention are possible, depending on the specific application.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. An apparatus for assisting placement of an original document on a top surface of an exposure platen, comprising:

a photosensor having an effective detection zone extending substantially parallel to the top surface of the platen;

an extendible stop disposed adjacent an edge of the platen, the stop being adapted for manual urging of said original document thereagainst; and control means for extending the stop from a non-functional position to a functional position in response to said original document being detected on the top surface of the platen by the photosensor.

2. The apparatus of claim 1, wherein the photosensor is sensitive to infrared light.

3. The apparatus of claim 1, further comprising a light source emitting a light beam in a main focus direction substantially parallel to a surface of the platen.

4. The apparatus of claim 3, wherein the light source emits infrared light.

5. The apparatus of claim 3, wherein the main focus direction of the light source intersects with the effective detection zone of the photosensor at a predetermined position on the surface of the platen.

6. The apparatus of claim 5, further comprising a second light source and a second photosensor, a main focus direction of the second light source and a main focus direction of second the photosensor extending parallel to a surface of the platen and intersecting at a second predetermined position on the surface of the platen.

7. The apparatus of claim 6, further comprising control means responsive to the second photosensor.

8. The apparatus of claim 1, further comprising means for selectably disabling the control means.

9. An apparatus for assisting placement of an original document on an exposure platen, comprising:

a photosensor having an effective detection zone extending substantially parallel to a surface of the platen;

an extendible stop disposed adjacent an edge of the platen, the stop being adapted for manual urging of said original document thereagainst, the photosensor being disposed along a first edge of the platen and the stop being disposed along a second edge of the platen; and control means for extending the stop from a non-functional position to a functional position in response to said original document being detected on the surface of the platen by the photosensor.

10. An apparatus for assisting placement of an original document bearing an image to be recorded on an exposure platen associated with a copier, comprising:

a light source emitting a light beam substantially parallel to a surface of the platen; and a photosensor adapted to detect light resulting from the reflection of the light beam by said original document on the surface of the platen.

11. The apparatus of claim 10, wherein the light source emits infrared light.

12. The apparatus of claim 10, wherein the photosensor is sensitive to infrared light.

13. The apparatus of claim 10, wherein a main focus direction of the light source and a main focus direction of the photosensor intersect at a predetermined position on the surface of the platen.

14. The apparatus of claim 13, further comprising a second light source and a second photosensor, a main focus direction of the light source and a main focus direction of the photosensor intersecting at a second predetermined position on the surface of the platen.

15. An apparatus for assisting placement of an original document on an exposure platen, comprising:

a light source emitting a light beam substantially parallel to a surface of the platen;

a photosensor adapted to detect light resulting from the reflection of the light beam by said original document on the surface of the platen:

an extendible stop disposed adjacent an edge of the platen, the stop being adapted for manual urging of said original document thereagainst; and control means for extending the stop from a non-functional position to a functional position in response to said original document being detected on the surface of the platen by the photosensor.

16. An apparatus for assisting placement of an original document bearing an image to be recorded on an exposure platen associated with a copier, comprising:

a light source emitting a light beam in a focus direction substantially parallel to a surface of the platen; and a photosensor adapted to detect light resulting from the reflection of the light beam by said original document on the surface of the platen, a main focus direction of the photosensor intersecting the focus direction of the light source at a predetermined position on the surface of the platen.

17. The apparatus of claim 16, wherein the light source emits infrared light.

18. The apparatus of claim 16, wherein the photosensor is sensitive to infrared light.

* * * * *